United States Patent
Wajs et al.

(10) Patent No.: US 9,667,688 B2
(45) Date of Patent: May 30, 2017

(54) METHOD AND SYSTEM FOR PROVIDING WATERMARKED CONTENT TO MULTIPLE END USER DEVICES

(75) Inventors: Andrew Augustine Wajs, Hoofddorp (NL); Dmitri Jarnikov, Hoofddorp (NL)

(73) Assignee: Irdeto BV, LS Hoofddorp (NL)

( * ) Notice: Subject to any disclaimer, the term of this patent is extended or adjusted under 35 U.S.C. 154(b) by 967 days.

(21) Appl. No.: 13/979,356

(22) PCT Filed: Jan. 14, 2011

(86) PCT No.: PCT/EP2011/050464
§ 371 (c)(1),
(2), (4) Date: Jul. 11, 2013

(87) PCT Pub. No.: WO2012/095181
PCT Pub. Date: Jul. 19, 2012

(65) Prior Publication Data
US 2013/0297737 A1 Nov. 7, 2013

(51) Int. Cl.
*G06F 15/16* (2006.01)
*H04L 29/08* (2006.01)
(Continued)

(52) U.S. Cl.
CPC .............. *H04L 67/02* (2013.01); *G06F 21/10* (2013.01); *G11B 20/00* (2013.01);
(Continued)

(58) Field of Classification Search
CPC . G06F 21/10; G06F 2221/0733; H04N 21/83; H04N 21/8358; H04L 2209/60; H04L 2209/608
(Continued)

(56) References Cited

U.S. PATENT DOCUMENTS 6,804,779 B1 * 10/2004 Carroni ................... G06F 21/10
713/150
6,959,288 B1 * 10/2005 Medina .............. G06Q 20/3829
709/217
(Continued)

FOREIGN PATENT DOCUMENTS

CN      101165699 A     4/2008
CN      101437163 A     5/2009
(Continued)

OTHER PUBLICATIONS

International Search Report and Written Opinion cited in corresponding International Application No. PCT/EP2011/050464 dated May 20, 2011.
(Continued)

*Primary Examiner* — Bharat N Barot
(74) *Attorney, Agent, or Firm* — Marc S. Kaufman; Rimon PC

(57) ABSTRACT

The invention relates to a method and system for watermarking in a content providing system having multiple parties. A first party system selects a first party watermark by selecting a watermarked copy of at least one first content element of the content elements. A second party system selects a second party watermark by selecting a watermarked copy of at least one second content element, different from the at least one first content element, of the content elements. Watermarked content is delivered to an end user device, the watermarked content containing the watermarked copy for the first content element selected by the first party system and the watermarked copy for the second content element selected by the second party system such that the watermarked content contains the first party watermark and the second party watermark.

17 Claims, 15 Drawing Sheets

(51) Int. Cl.
  *G06F 21/10* (2013.01)
  *G11B 20/00* (2006.01)
  *H04N 21/8358* (2011.01)
  *H04N 21/83* (2011.01)
(52) U.S. Cl.
  CPC . *H04N 21/8358* (2013.01); *G06F 2221/0733* (2013.01); *H04L 2209/60* (2013.01); *H04L 2209/608* (2013.01); *H04N 21/83* (2013.01)
(58) Field of Classification Search
  USPC .................................. 709/201–203, 217–219
  See application file for complete search history.

(56) References Cited

U.S. PATENT DOCUMENTS

| | | | | |
|---|---|---|---|---|
| 7,346,580 | B2* | 3/2008 | Lisanke | G06F 21/10 709/201 |
| 7,593,543 | B1* | 9/2009 | Herz | G06F 21/10 382/100 |
| 8,131,646 | B2* | 3/2012 | Kocher | G06F 21/10 709/217 |
| 2003/0093665 | A1 | 5/2003 | Cooper et al. | H04L 9/00 |
| 2006/0193474 | A1* | 8/2006 | Fransdonk | H04L 9/0825 380/279 |
| 2008/0270575 | A1* | 10/2008 | Rodriguez | G06F 17/30038 709/219 |
| 2008/0301456 | A1 | 12/2008 | Staring et al. | H04L 9/06 |

FOREIGN PATENT DOCUMENTS

| | | |
|---|---|---|
| CN | 101833745 A | 9/2010 |
| EP | 1865651 A1 | 12/2007 |
| WO | 2005119557 A2 | 12/2005 |

OTHER PUBLICATIONS

PCT International Search Report and Written Opinion issued in corresponding PCT Application Serial No. PCT/EP2011/050464 dated May 20, 2011 (11 pgs).

Examination Report cited in Canadian Application No. 2,824,306 dated Oct. 18, 2016.

* cited by examiner

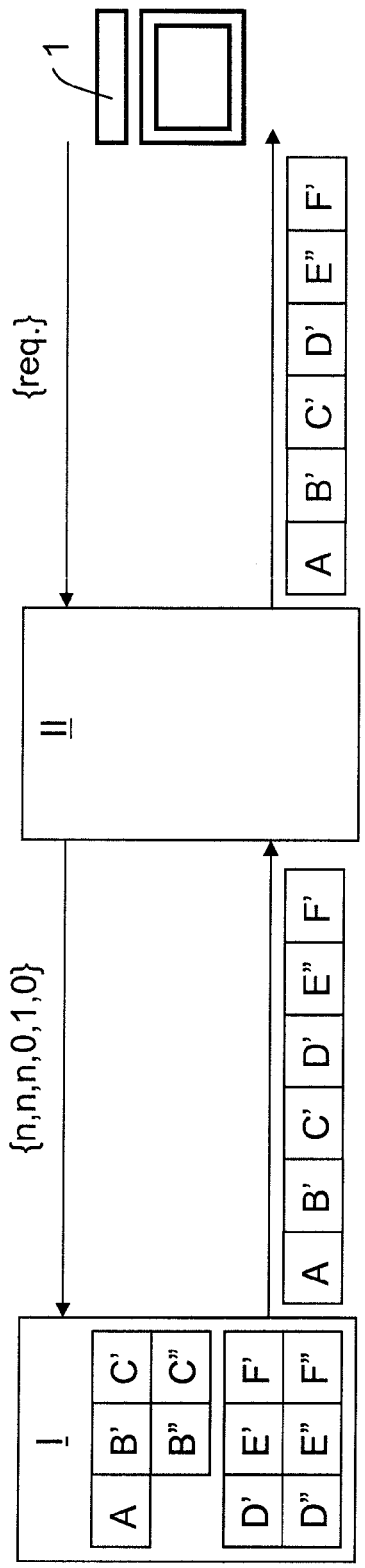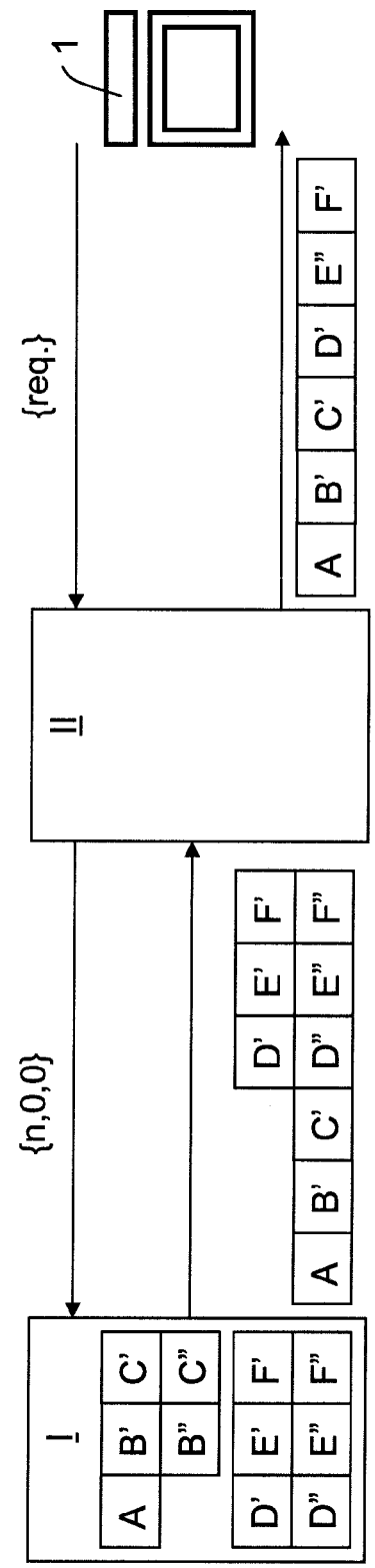
FIG. 2A
FIG. 2B

METHOD AND SYSTEM FOR PROVIDING WATERMARKED CONTENT TO MULTIPLE END USER DEVICES

FIELD OF THE INVENTION

The invention relates to the field of content provision to end-user devices. More specifically, the invention relates to the field of providing watermarked content to end-user devices involving multiple parties in the content providing system.

BACKGROUND OF THE INVENTION

The latest developments of internet streaming protocols for delivering multimedia content brought up protocols that allow transmitting content as a set of time-bounded content elements, also referred to as chunks, that are physically separated (e.g. a file is created for each chunk of content) or logically separated (e.g. all chunks of content are stored in a single file with an addressing structure that allows to access any chunk individually). The former technique is used by HTTP Live Streaming or 3GPP adaptive HTTP Streaming, whereas the latter technique is employed by Microsoft Smooth Streaming.

Premium content, such as pay television in e.g. video-on-demand applications, continues to require protection in order to prevent unauthorized access to such content and to detect leaks in the protection. Whereas unauthorized access to content may e.g. be avoided by using encryption techniques, tracing of content is usually performed by employing watermarks. Watermarking involves the insertion of (unique) information into the content in a non-removable manner and in a manner typically not or hardly noticeable for the user at the receiving side. Watermarking allows the identification of a source that redistributes premium content without authorization.

Multiple parties are usually involved in the distribution of content to end users, such as a content creator, a content aggregator, one or more network providers etc. If each participant in the distribution chain inserts their own watermark without consideration of watermark embedding efforts of other parties, there is a potential for overlapping or colliding watermarks which results e.g. in content encoding inefficiencies.

There is a need in the art for efficient watermarking of content in a multiparty content providing environment.

SUMMARY OF THE INVENTION

A method for providing watermarked content to an end-user device via a content providing system is disclosed. The content providing system comprises at least a first party system and a second party system. Content elements, e.g. in the form of separate files or as addressable elements in a single file, are provided. The content elements contain at least a first content element for which at least two copies are provided with different watermarks and at least a second content element for which at least two copies are provided with different watermarks. As set forth herein, copies of content elements are defined as content elements having the same content relevant for the end-user. However, the copies may differ in the watermark applied for the copies, which watermark is typically not or hardly not noticeable by the end-user and therefore appearing identical. The first party system selects a first party watermark by selecting a watermarked copy of the at least one first content element of the content elements. The second party system selects a second party watermark by selecting a watermarked copy of the at least one second content element, different from the at least one first content element, of the content elements. The watermarked content is delivered to the end-user device containing at least the watermarked copy for the first content element selected by the first party system and the watermarked copy for the second content element selected by the second party system such that the watermarked content contains the first party watermark and the second party watermark.

A further aspect of the disclosure relates to system for providing watermarked content to an end-user device. The system comprises a content element provider configured for providing content elements for the content, wherein at least two copies of at least a first content element and at least two copies of at least a second content element are provided, and wherein the at least two copies of the at least one first content element are provided with different watermarks and the at least two copies of the at least one second content element are provided with different watermarks. The system also comprises a first party system and a second party system. The first party system is configured for selecting a first party watermark by selecting a watermarked copy of the at least one first content element of the content elements. The second party system is configured for selecting a second party watermark by selecting a watermarked copy of the at least one second content element, different from the at least one first content element, of the content elements. The system is arranged for providing watermarked content to the end-user device, the watermarked content containing at least the watermarked copy for the first content element selected by the first party system and the watermarked copy for the second content element selected by the second party system such that the watermarked content contains the first party watermark and the second party watermark.

Further aspects of the invention include a first party system and a second party system as defined in the disclosure.

The method and system enable multiple parties in the content providing chain to each select the watermarked content elements for a particular portion of the watermarked content in a coordinated fashion, especially in a content delivery network of the content providing system, in order to obtain a sequence of watermarked content elements reflecting the path via which the content was provided to the end-user devices. The coordination relates to the allocation which party is allowed to select a watermarked copy for which content element(s). In particular, a system of a first party is entitled to select particular watermarked copies of one or more first content elements and a system of a second party is entitled to select particular watermarked copies of one or more second content elements. The coordination between the parties may be explicit (e.g. by an information exchange between the parties, such as an electronic request from one party to another or a contractual agreement) or implicit (e.g. by prohibiting or making it otherwise impossible for the second (first) party to select watermarked copies of content elements assigned for the first (second) party to provide the first (second) party watermark). The first and second party system may be configured to select a particular copy from a received set of content elements by their internal setting(s).

The content is uniquely watermarked for the path to the end-user device by the combination of the watermarks selected by the watermarking selecting parties in the content delivery system. If only the first and second party system are involved in the content distribution or at least in the watermarking of the content, the combination of the first and second party watermark results in a unique watermark for the path to the end-user device. If systems of further parties are involved in the watermarking process, the combination of the first party watermark and second party watermark is not yet necessarily unique for the path to the end-user device.

It should be noted that the second party system may be a consumer unit of a home network that connects a content delivery network to multiple end-user devices via the home network. It should also be noted that party systems not necessarily relate to different economic entities, but relate to systems that desire to participate in determining which watermarked copies should be transmitted.

It should be noted that the first and/or second content elements for which watermarked copies are selected are not necessary successive files or blocks of content within a single file.

In an embodiment, the first party system and second party system are systems in a content delivery network. Such systems are typically not capable of watermarking content elements themselves since watermarking requires relatively complex and expensive equipment. Such content delivery network systems, however, can select pre-watermarked copies of first and second content element, such that it is possible to obtain watermarked content indicating the passage of the content via the first and second party system. Examples of content delivery networks include unicast, multicast or broadcast networks, e.g. an ADSL network or an IPTV network. An example of a party system in such a content delivery network includes e.g. a DSLAM.

In an embodiment, the content providing system comprises a third party system between the second party system and the end-user device. The third party system selects a third party watermark by selecting a watermarked copy of at least one third content element of the content elements. The watermarked content can be delivered to the end-user device containing the watermarked copy selected by the third party system such that the watermarked content contains the third party watermark. This embodiment facilitates watermarking in a system containing three parties before the end-user device is reached. The combination of the first, second and third party watermark is unique for the path to the end-user device if the content providing system does not contain further watermarking parties. The third party system can be another system in a content delivery network.

In an embodiment, the first party system is communicatively connected to both the second party system and a fourth party system. The fourth party system selects watermarked copies of the content elements to obtain a fourth party watermark. This enables providing the watermarked content with the first party watermark and the second party watermark if the content is provided via the first and second party systems and to provide the watermarked content with a first party watermark and a fourth party watermark if the content is provided via the first and fourth party system such that the path of the content can be traced. The fourth party system can be another system in a content delivery network.

As mentioned before, various embodiments for watermark selection coordination between the parties in the content providing system have been envisaged, each embodiment having advantageous effects.

In one embodiment, the first party system provides watermark selection information for selecting the watermarked copy in accordance with the first party watermark to the second party system. Providing watermark selection information may be performed in various ways, including electronic transmission of the watermark selection information or delivering the watermark selection information on a storage medium. The second party system contains, receives or has otherwise access to the at least two copies of the at least one first content element. These copies may have been obtained at an earlier stage and may e.g. have been provided on a storage medium or be transmitted to the second party system. This embodiment allows caching of the content elements in a content delivery network, while enabling the first party system to select the first party watermark via the watermark selection information. It should be noted, however, that the to-be-selected and/or the not-to-be-selected copies of the at least one first content element may also be transmitted to the second party system with the watermark selection information, but that these not-to-be-selected copies are not noticeable from the watermark selection information.

In another embodiment, the first party system obtains watermark selection information in accordance with the second party watermark from the second party system and provides to the second party system the selected watermarked copy of the at least one second content element in accordance with the received watermark selection information, e.g. by electronic transmission or by providing on a storage medium. This embodiment allows the full selection of the watermarked copies of the content elements to be made at the source, thereby saving bandwidth when transmitting the watermarked content to the end user device.

In the previous two embodiments, the watermark selection information provided for an explicit coordination between the first and second party system by signalling the content elements allocated to a party system for selecting watermarked copies.

In still another embodiment, implicit coordination is provided by the first party system providing the selected watermarked copy of the at least one first content element and all copies of the at least one second content element to the second party system, e.g. by electronic transmission or providing on a storage medium. By only providing the selected watermarked copy to a next party system in the content providing system or by prohibiting access to other copies of the same content element for which a watermarked copy is selected by the first party system, the next party system can only use watermarked copies of content elements for which a selection can still be made to create its party watermark.

In another embodiment, watermark selection can be performed on the basis of the position or identity of the first party or second party system in the content providing system. This embodiment enables determining the position of the party systems once and omitting the need for further watermark selection information signalling afterwards. Alternatively, or in addition, a next destination for the watermarked content elements selected by the first party system or second party system can be used to select the watermarked copies.

In an embodiment of the invention, at least one of the first party system and the second party system is configured for receiving the watermarked content as a single file containing at least the watermarked copies for the at least one second content element (and possibly also watermarked copies for the content elements available for watermarking to other parties). The second party system is also configured for sending the watermarked content to a particular end-user device over a content delivery network. The second party system selects the watermarked copy for the at least one second content element in accordance with the second party watermark by skipping (e.g. by sending a skipping command to the first party system) or dropping at least one watermarked copy in the single file not associated with the second party watermark in the second party system. The first or second party system is preferably located near a network edge. Such systems are typically of limited capability and skipping/dropping operations provide for effective yet simple operations at this location for selecting the watermarked copies to obtain the watermark. The first party system may e.g. be a head-end system in a content delivery network. The second party system re-uses existing API's in the first party system to skip to relevant parts of the content file based on the playlist/metadata of the content file.

Hereinafter, embodiments of the invention will be described in further detail. It should be appreciated, however, that these embodiments may not be construed as limiting the scope of protection for the present invention.

BRIEF DESCRIPTION OF THE DRAWINGS

In the drawings:

FIGS. 2A-2C illustrate various embodiments for multi-party watermarking;

DETAILED DESCRIPTION OF THE DRAWINGS

Figure 1A:
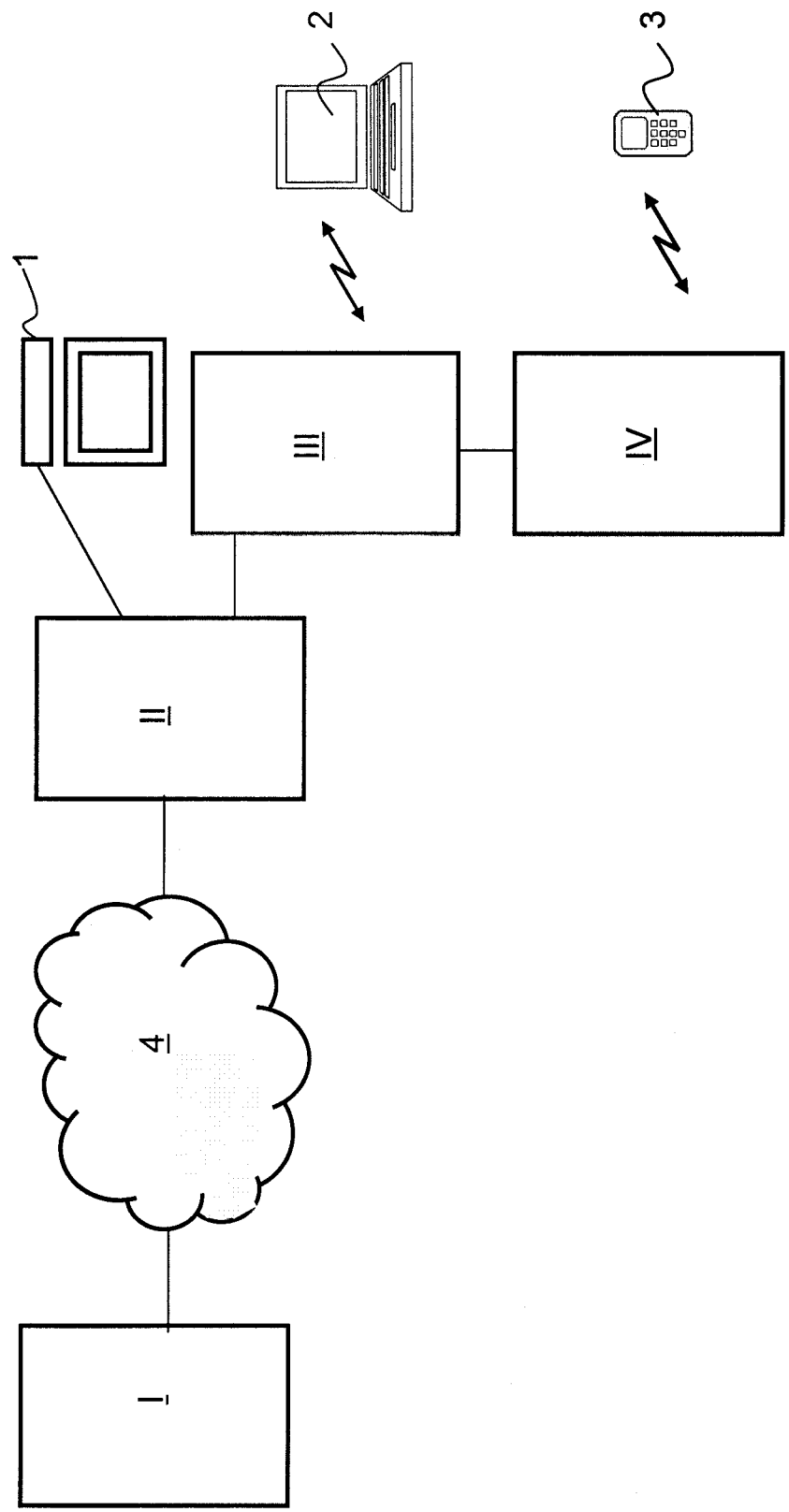
FIGS. 1A and 1B are schematic illustrations of a system for content providing to a plurality of end-user devices according to embodiments of the invention.
Figure 1B:
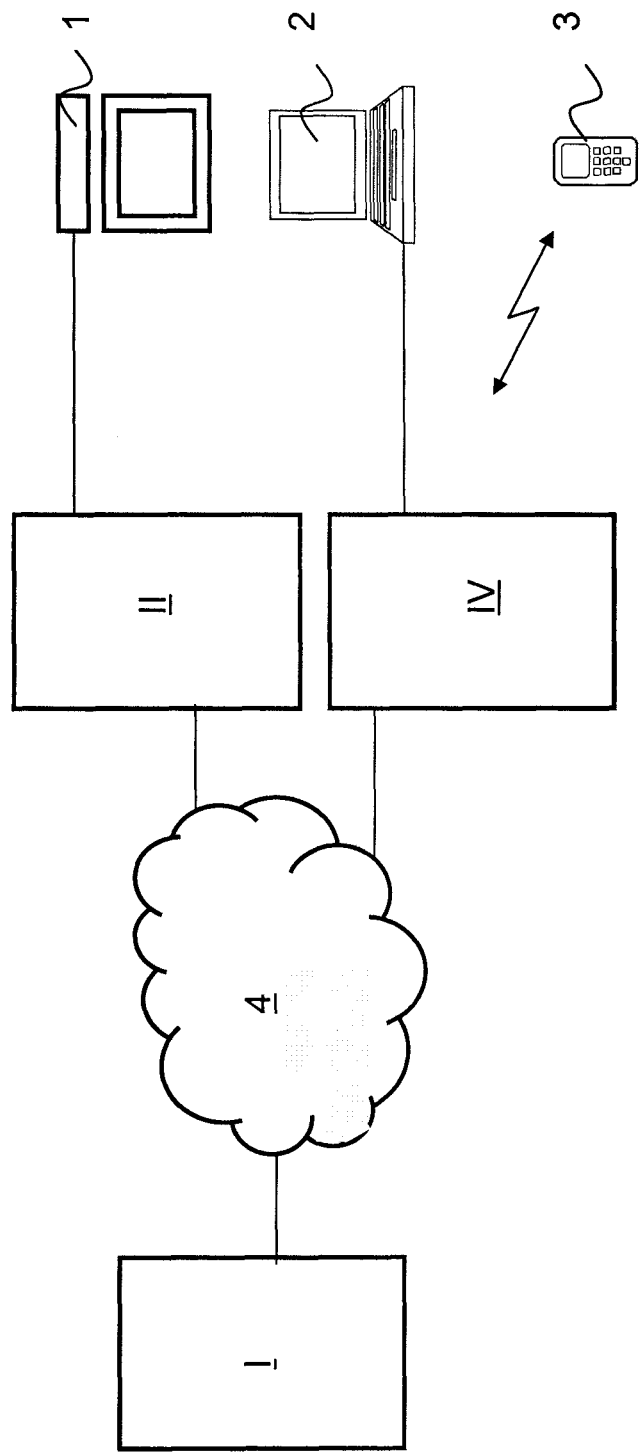

FIGS. 1A and 1B provide schematic illustrations of a system comprising a first party system I, a second party system II for content delivery to a number of end-user devices 1, 2 and 3. The systems enable content delivery from the first party system I via the network 4 and one or more further party systems to these end-user devices 1, 2 and 3. Network 4 may be a content delivery network. In FIG. 1A, content delivery to end-user device 1 involves only the first party system I and second party system II, while content delivery to end-user devices 2 and 3 involves a third party system III and a third and fourth party system IV, respectively.

The first party system I may e.g. be a system of a content owner, whereas the second, third and fourth party system may e.g. be systems of a content aggregator, a network provider, a further network provider, a customer household device etc. Alternatively, the first party system I may receive content from a content owner or another preceding party system such as a head-end system, i.e. the first party system is not necessarily the first system in the content providing chain. In a particular embodiment, the first party system and second party system are systems of a content delivery network. As an example, first party system I may be a head-end system. Second party system may be a further system in a content delivery network, e.g. a DSLAM. The networks or connections mutually connecting the party systems and the networks connecting the end-user devices may either be wireless or wired. End-user devices 1, 2 and 3 may comprise set top boxes, computers, mobile phones etc, i.e. devices capable of rendering the delivered content.

Figure 2C:
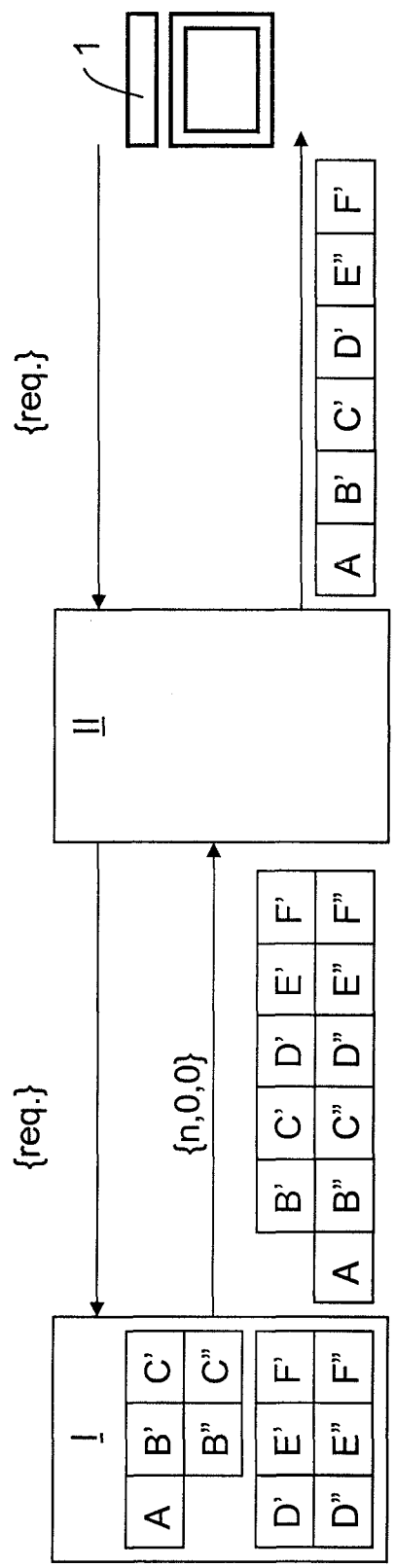

FIGS. 2A-2C illustrate various embodiments for multi-party watermarking in the system of FIG. 1A for content providing from the first party system I to end-user device 1 via second party system II. Again, it should be noted that first party system I and second party system II may be any party systems in a content providing system and are not necessarily succeeding systems in a content delivery network.

In the figures, content elements are indicated by A, B and C, whereas copies of content elements with different watermarks are indicated by B', C', D', E', F' (watermark 0) and B", C", D", E" and F" (watermark 1). Copies of content elements are content elements having the same content relevant for the end-user. However, the copies differ in the watermark applied for the copies, which watermark is typically not or hardly not noticeable by the end user and therefore appearing identical. It should be noted, of course, that more than two copies with different watermarks can be used and that more than six content elements will usually make up a stream of content elements. It should also be noted that watermarks indicated by ' or " for different content elements are not necessarily the same watermark.

In FIGS. 2A-2C, the arrows may relate to electronic transmissions or to other forms of information providing, such as by means of a storage medium. Requests from party systems may comprise parameters used for indicating the watermarked copies to be selected for such a party system. Requests from end user devices typically do not include direct indications for watermark selection. However, such requests may be associated by a party system with a particular (set of) watermark(s), e.g. on the basis of an identification of an end-user device or a session identifier or an identifier of a party system.

The request from the end-user device may be directed either to the second party system II, as illustrated in FIGS. 2A-2C or to the first party system I.

In FIG. 2A, the second party system II receives a request for content from end-user device 1. Second party system II, triggered by the request from end-user device 1, transmits a request {n,n,n,0,1,0} to the first party system I. The request {n,n,n,0,1,0} contains watermark selection information from the second party system II, indicating that for the second content elements D, E and F, respectively the first copy D' (indicated by the '0' on the fourth position), the second copy E" (indicated by the '1' on the fifth position) and the first copy F' (indicated by the '0' on the sixth position) should be selected. For the first content elements A, B and C, the second party system does not provide selection information, indicated by the 'n' on the first, second and third positions in the request. The first party system I, receiving the request from the second party system II as a policy always returns first copies B' and C' as first content elements upon requests from the second party system II. For first content element A, copies are not available. Accordingly, the first party system I transmits to the second party system II content elements A, B' and C' as selected by the first party system and content elements D', E" and F' as selected by the second party system II. Second party system II forwards the content elements A, B', C', D', E" and F' to end-user device 1 as uniquely watermarked content. In case another end-user device would have requested content, the second party system II could have requested different copies for content elements D, E and F from the first party system I to obtain a uniquely watermarked content for the other end-user device. In case, end-user device 1 would have requested content via fourth party system IV (see e.g. FIG. 1B), the fourth party system IV would have received or selected different copies for content elements B and C than B' and C' than in second party system II in order to make a distinction between content provision via the second party system II and the fourth party system IV.

FIG. 2B provides for an alternative method of watermarking selection. The request {req.} from end-user device 1 is assigned watermarking {0,1,0} for the second content elements to be selected by the second party system II, i.e. for the second content elements D, E and F, copies D', E" and F' should be selected. The request received from the end-user device 1 triggers second party system II to make a request to first party system 1. The parameters in the request are indicative of the watermarking selection to be made by the first party system 1 for the first content elements A, B and C. The value of the parameters in the watermark selection information could e.g. be contractually agreed. The first party system I returns for the first content elements A, B' and C' in accordance with the parameters {n,0,0} in the request from the second party system II and also returns all copies for the second content elements D, E and F, i.e. D', D", E', E", F' and F" as illustrated in FIG. 2B. The second party system II cannot make a selection of copies for the first content elements A, B and C, since only specific copies have been transmitted, whereas a selection can be made for the second content elements D, E and F. In accordance with the parameters {0,1,0} assigned to the request from end-user device 1, second party system II selects copies D', E" and F' respectively and transmits the watermarked content to end-user device 1.

FIG. 2C provides yet another alternative for the watermarking selection. Again, second party system II receives a request from end-user device 1 as in the method of FIG. 2B. Second party system II issues a request {req.} to the first party system I. First party system I transmits watermark selection information {n,0,0} to second party system II. Prior to or along with the watermark selection information, first party system I also provides the differently watermarked copies of the first content elements B and C and the differently watermarked copies of second content elements D, E and F to the second party system II. Second party system II mandatorily selects copies A, B' and C' for the first content elements A, B and C in accordance with the watermark selection information {n,0,0} and copies D', E" and F' for the second content elements D, E and F in accordance with {0,1,0} assigned to the request {req.} from the end-user device 1.

In FIGS. 2A-2C, it is assumed that the (watermarked copies) of content elements A-F are available at the first party system I. It should be noted, however, that the first party system I may alternatively receive the copies of watermarked content elements from a preceding party system, e.g. a content owner CO and/or a content aggregator CA. This situation is depicted in FIG. 3.

Figure 3:
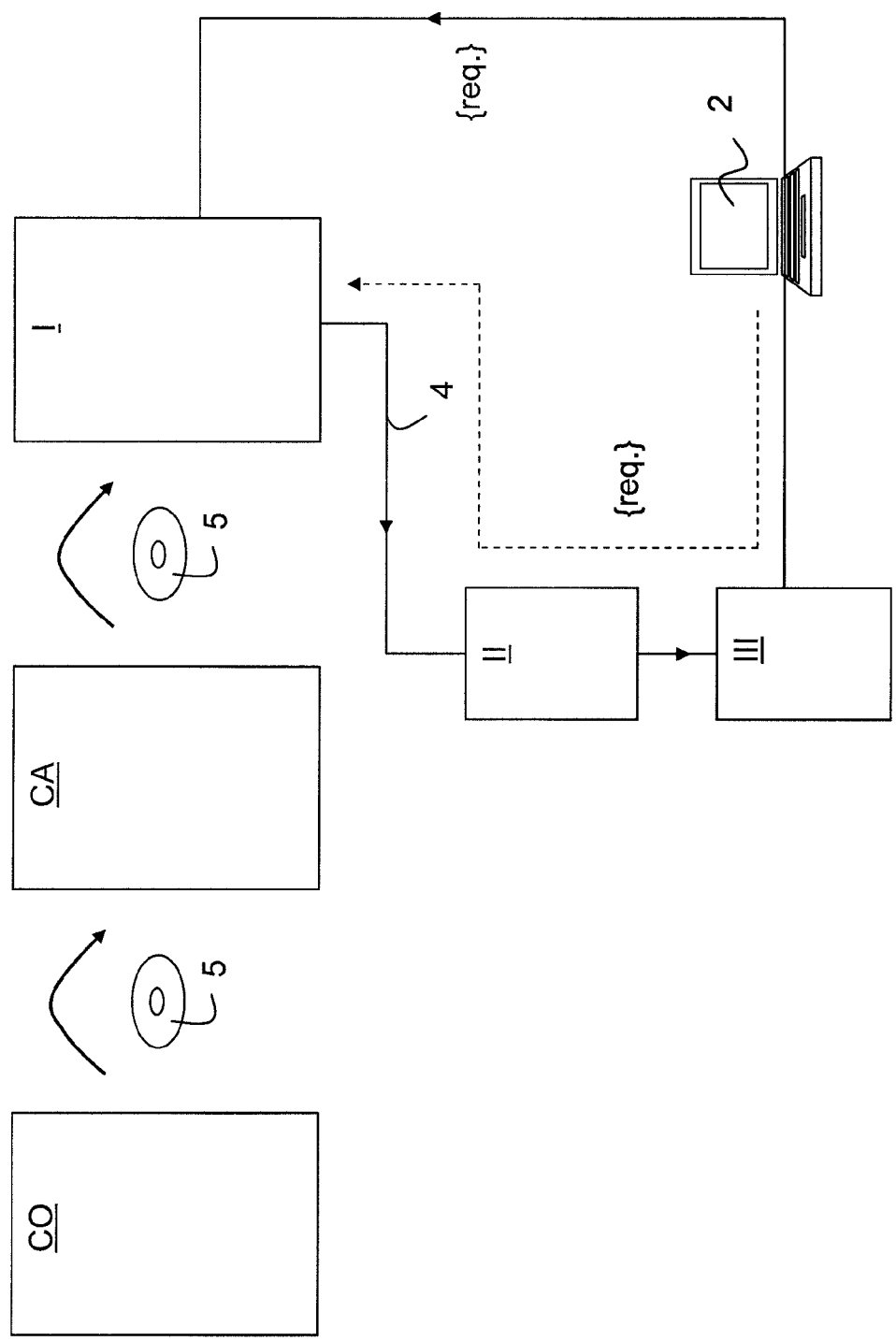
FIG. 3 illustrates a multiparty watermarking content providing system comprising a first content providing system of professional parties and a content delivery network comprising further party system for content delivery to end-user devices.

FIG. 3 depicts a first content providing network of content from a content owner CO (which may be the content creator) to a content aggregator CA and then further to a head end system I. The content can be transmitted between the parties, e.g. by a file upload or download or alternatively on a storage medium, such as a disc 5 (e.g. a DVD or Blu-ray disc). The head end system I is connected to a content delivery network 4 comprising second party system II and third party system III in order to deliver data to end-user device 2.

It is assumed that one or more systems of the content owner CO, the content aggregator CA and the head end system I in the first content providing network may be configured for performing complex tasks such as watermarking. In contrast therewith, second party system II and third party system III in the content delivery network 4 comprise more simple systems not capable of watermarking content. Yet, it is desired that second party system II and third party system III are capable of leaving traces that the content has passed these systems by selecting watermarked copies. These party systems may e.g. select watermarked copies on the basis of the position or identity in the content delivery network and/or on the basis of the next destination of the content.

One embodiment of operating the system of FIG. 3 involves a content owner system CO providing the content as content elements (e.g. each content element is a separate file or the content elements are contained as addressable content elements in a single file) and to provide at least two copies for at least some of the content elements. Content owner system has the capacity of watermarking the content elements.

In one embodiment, content owner system CO watermarks a set of content elements with its own watermark and watermarks a further set of content elements with the watermark of content aggregator system CA as a succeeding party system in the first content providing network. The CO watermark provided by content owner system CO can be based on the identity of the content aggregator CA as a next destination in the content providing system. The copies of still further content elements are provided with different watermarks. The thus obtained content is provided to CA party system as content elements including the watermarked copies of content elements and the content elements with the CO watermark and CA watermark. The content aggregator party CA in this embodiment may e.g. simply forward the thus watermarked content to the head-end system I. In an alternative embodiment, further illustrated in FIG. 7, content aggregator system CA may itself add watermarks for particular content elements.

Head-end system I, in this embodiment, is the final party system of the first providing system and the content stored as content elements in the head-end system I now contains content elements watermarked with the CO watermark, content elements watermarked with the CA watermark and at least three copies of still further content elements that are to be selected by the head-end system I and the further party systems II and III in the content delivery network 4. As an alternative, the content may be available including watermarked copies of content elements and a play list provided by the content owner system CO and content aggregator system CA, the playlist indicating which watermarked copies should be selected to include the CO watermark and the CA watermark when the content is played out. In particular, the playlist contains references to watermarked copies from which downstream party systems can be make a selection. Content elements for which copies have been selected by preceding party systems are no longer visible in the playlist to succeeding party systems.

A request {req.} from end-user device 2 for the content arrives at the head-end system I. It should be noted that the request may alternatively reach the head-end system via party systems III and II in which case party systems III and II, indicated by the dashed arrow, may possibly modify the request (e.g. by adding identity information) Head-end system I determines a watermark from the request, e.g. on the basis of a user identifier or a session identifier, and selects watermarked copies of first content elements for the request. Selection of the watermarked copies may be based on the identity of the second party system II to which the content should be sent. The identity of the second party system may be pre-programmed in the head-end system or may be communicated to the head-end system I, e.g. via the request {req.} obtained via second party system II.

Head-end system I then forwards the content elements watermarked with the CO watermark, content elements watermarked with the CA watermark, selected copies of content elements representing the first party watermark of head-end system I and copies of watermarked content elements still to be selected by the second party system II and third party system III. The second and third party system II and III can successively select watermarked copies for second content elements and third content elements respectively in order to provide a second party watermark and a third party watermark. Selection of watermarked copies by the second and third party systems II and III may again be based on the next destination of the watermarked copies. Finally, the content is uniquely watermarked for the end-user device 2 and includes watermarks for the party system in the content providing system enabling tracing of path of the content in the content providing system. Unique watermarking for a particular end-user device may be obtained by selection of particular watermarked copies in the second and third party systems II and III, e.g. using the request {req.} transferred to the head-end system I via party systems II and III.

Figure 4A:
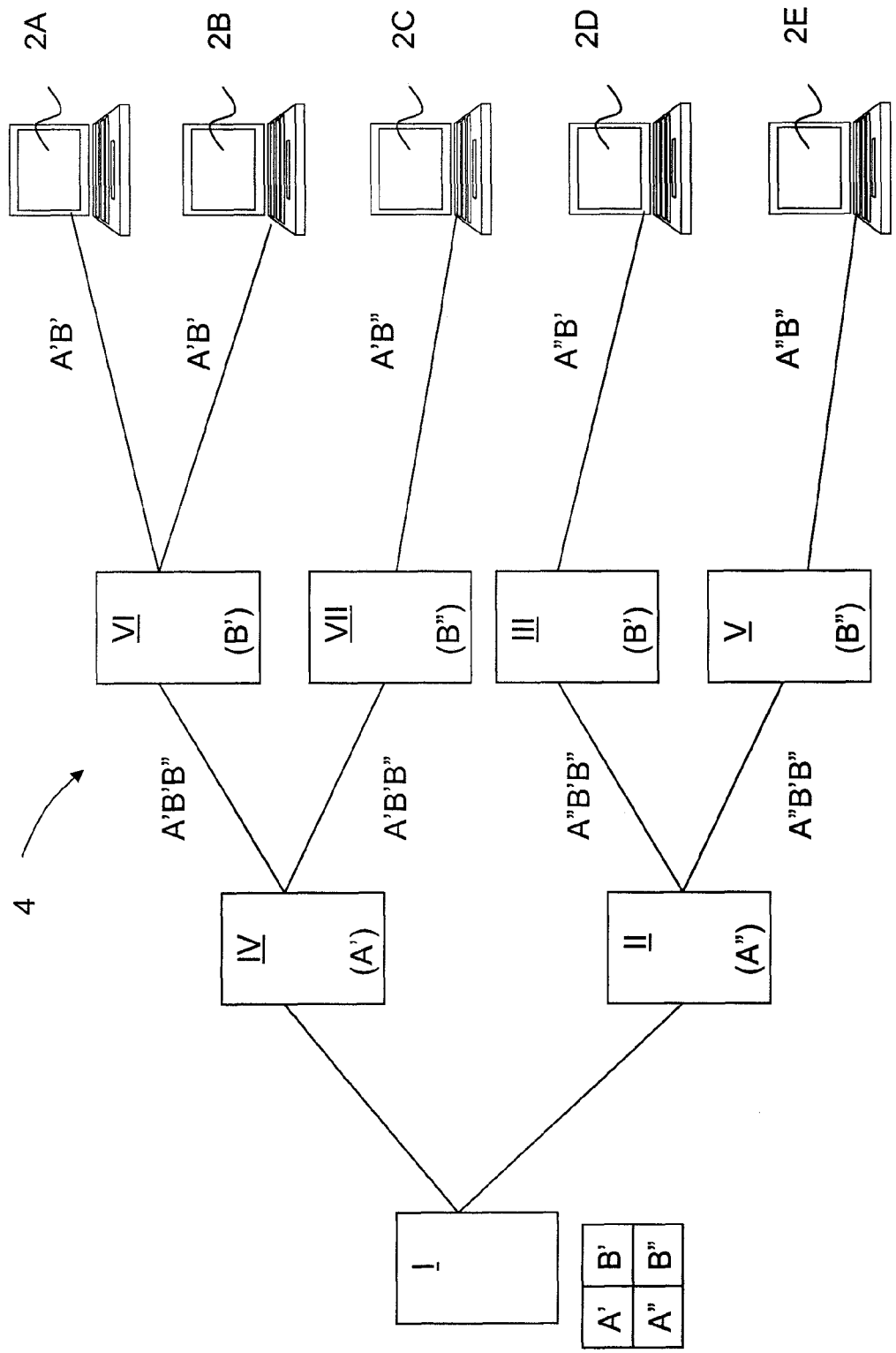
FIGS. 4A and 4B illustrate different embodiments for a content delivery network for delivering watermarked content to end-user devices.

FIG. 4A illustrates an embodiment of a content delivery network 4 comprising a plurality of content delivery paths to different end-user device 2A-2E via different party systems II-VII for content elements from head-end system I. In this embodiment, selection of watermarked copies of content elements is not based on the next destination of the content, but on the identity or position of the party system itself. Head-end system I contains the following watermarked copies of content elements: A', A", B' and B". For each party system II-VII, the watermarked copy to be selected by the party system on the basis of its identity or position in the content delivery network 4 is indicated in FIG. 4 between parentheses. Thus, party system II selects A" for the first content element, party systems IV selects A' for the first content element, party systems III and VI select B' for the second content element and party systems V and VII select B" for the second content element. Watermarked copies of content elements may be selected by the party systems in the content delivery network 4 using skip operations and/or drop operations as further described with reference to FIGS. 11A and 11B.

For each of the end-user devices 2A-2E requesting the content from head-end system I, the path via which the content is delivered is apparent from the watermark selection in the path. As indicated, a watermark A'B' is obtained for end-user devices 2A and 2B reflecting the path via party systems IV and VI, a watermark A'B" is obtained for end-user device 2C reflecting the path via party systems IV and VII, a watermark A"B' is obtained for end-user device 2D reflecting the path via party systems II and III and a watermark A"B" is obtained for end-user device 2E reflecting the path via party systems II and V. Of course, in general, the content comprises more than two content elements, such that the source of the content, e.g. head-end system I, can also be indicated by creation or selection of a watermarked copy of a content element, such as indicated with reference to FIG. 3.

It is noted that end-user devices 2A and 2B have obtained the same watermarked content elements A'B' since the same path was followed through delivery network 4. The content can be made unique also for the end-user device by e.g. assigning a particular copy of a watermarked content element upon receiving the request for the content in e.g. the head-end system I as illustrated e.g. in FIG. 8 by the personalization control block.

Figure 4B:
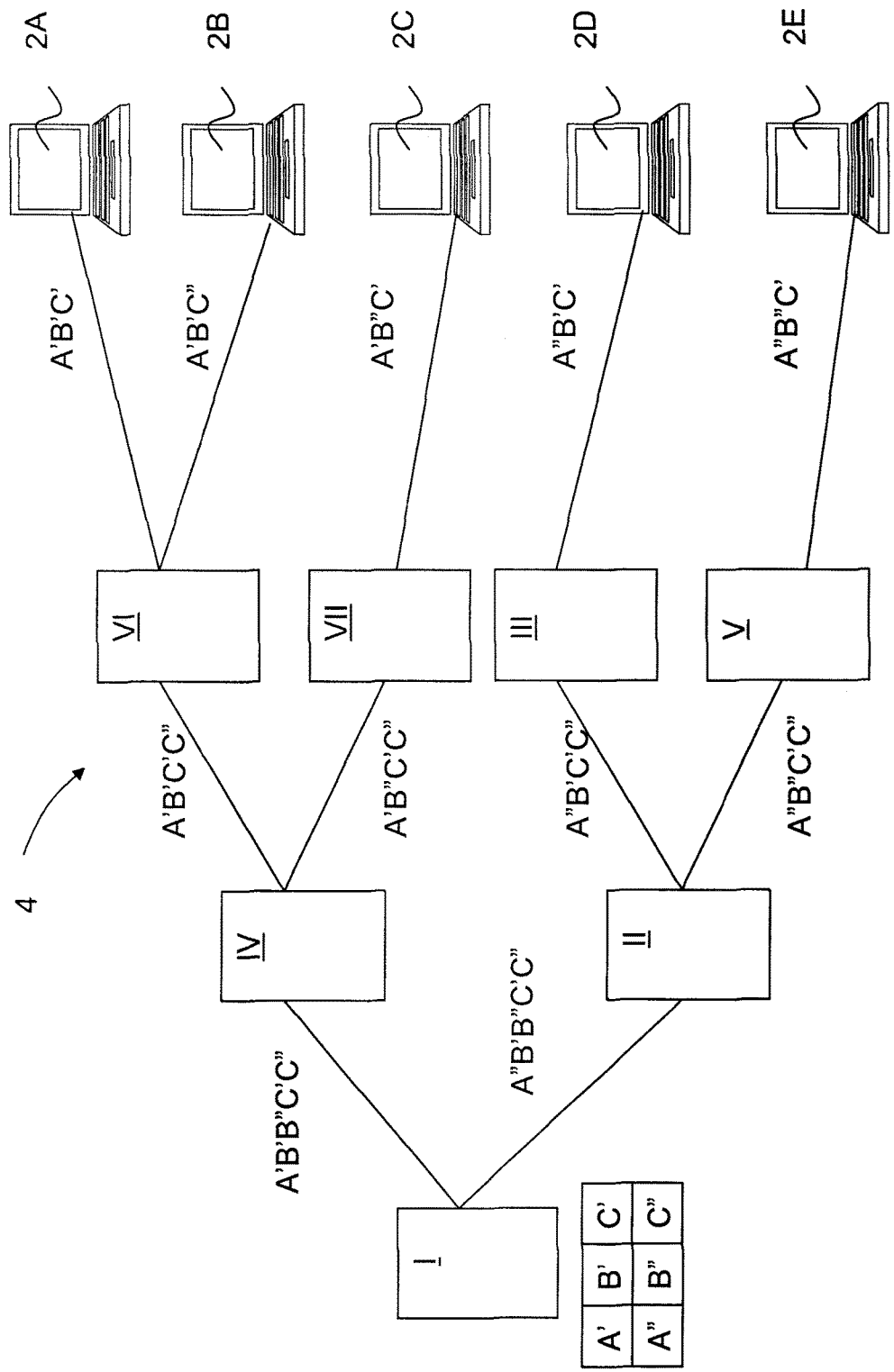

The embodiment of FIG. 4B illustrates systems that select watermarked copies on the basis of the next destination of the content. So, system 1 selects watermarked copy A' or A" dependent on whether the next destination is system IV or II, respectively. System IV (II) selects watermarked copy B' for content to be transferred to system VI (III) as a next destination, whereas watermarked copy B" is selected for content destined for system VII (V). Systems III, V, VI and VII in turn select watermarked copies C', C" dependent on the end-user device 2A-2E in order to enable personalization of the final content. For example, systems III has obtained information relating to whether the content should be delivered to end-user device 2A or 2B and may, therefore, also use this information to select either C' or C".

Figure 5:
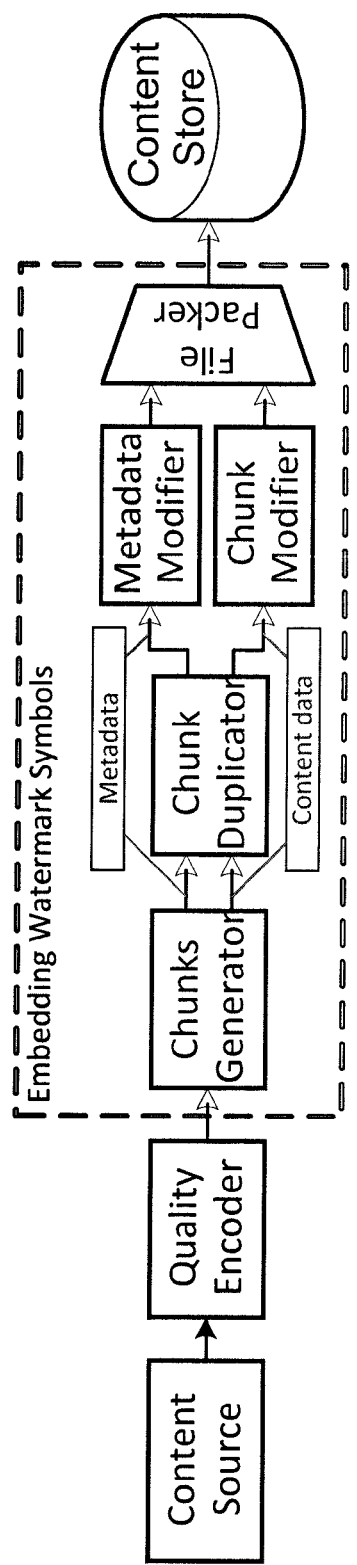
FIG. 5 is a schematic illustration of a system for obtaining watermarked content elements and watermark selection information.
Figure 6:
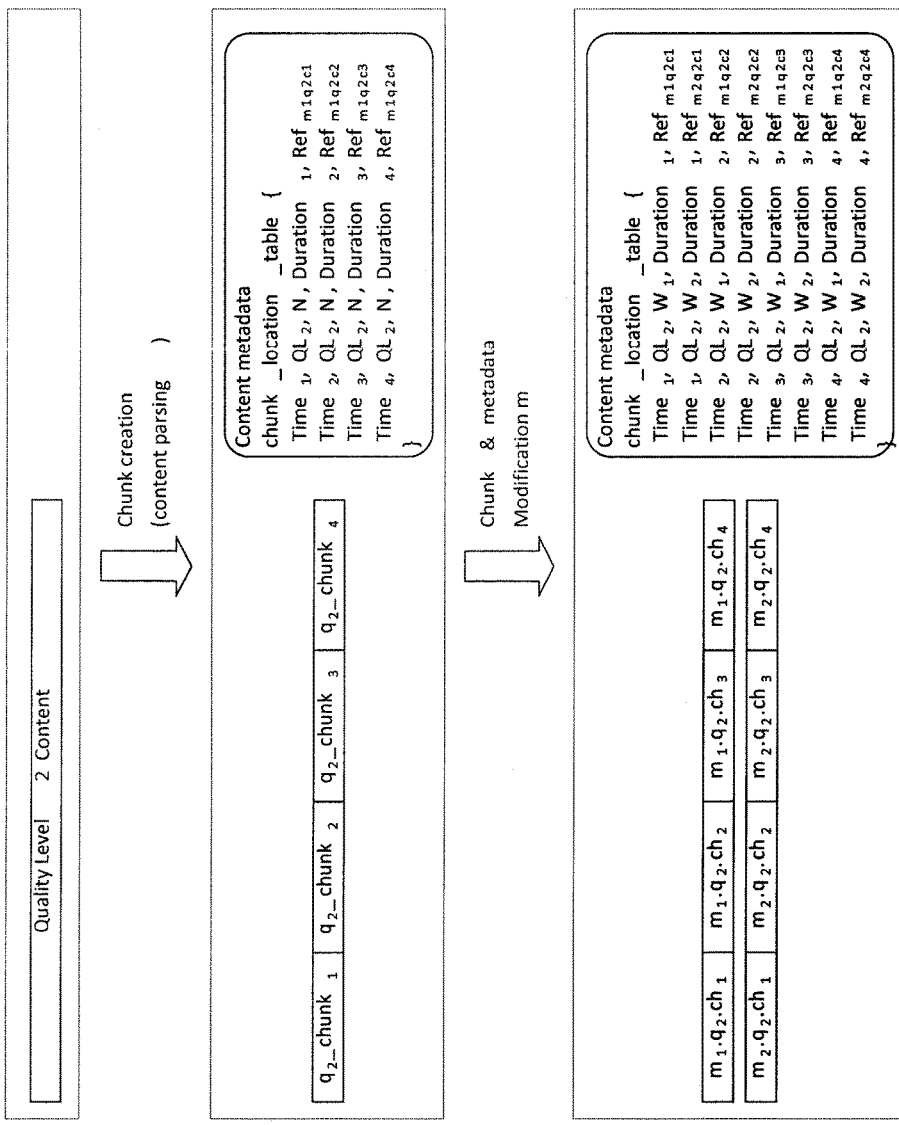
FIG. 6 illustrates the creation of watermarked content elements and watermark selection information in accordance with the system of FIG. 5.

FIG. 5 depicts a system for providing watermarked content elements. Such a system may e.g. be a content owner system CO as depicted in FIG. 3 or a head-end system I. FIG. 6 illustrates the processing by the system to obtain the copies of watermarked content elements in a content store.

In the system of FIG. 5, content is provided from a content source and quality encoded to a particular quality q2, e.g. a specific bit rate. The quality encoded content is separated in content elements, referred to as chunks in the drawings, by a chunk generator. The chunk generator parses the original encoded content and creates content chunks that contain a short sequence of content information of sufficient length for embedding a watermark symbol of minimal size (e.g. a single bit). For each chunk, at least one copy is provided in a chunk duplicator. The copies of a chunk are modified to obtain different copies of the chunk, e.g. copies with different watermarks. Examples include content elements B-F described with reference to FIGS. 2A-2C and FIG. 4, for which two copies each are provided by the chunk duplicator and which are each provided with different watermarks ' and " per content element. The chunk modifier embeds a watermark symbol in the chunk and optionally encrypts the chunk. All possible watermark symbol values may be embedded in alternate chunks. For example a single bit watermark symbol for a chunk involves making two copies of a chunk: one with a '0' watermark and the other with a '1' watermark embedded. The differently watermarked copies of the content elements may be stored separately in the content store or, as illustrated in FIG. 5, be packed in a single file by a file packer. In parallel with the processing of the content elements, metadata is generated and modified to reflect the processing of the content elements as shown in FIG. 6. The content metadata describes the content by recording relevant information for all chunks such as watermark symbol value, quality level, start time, duration. The metadata also contains a reference to the storage location of the chunk (a URL or a file offset).

Figure 7:
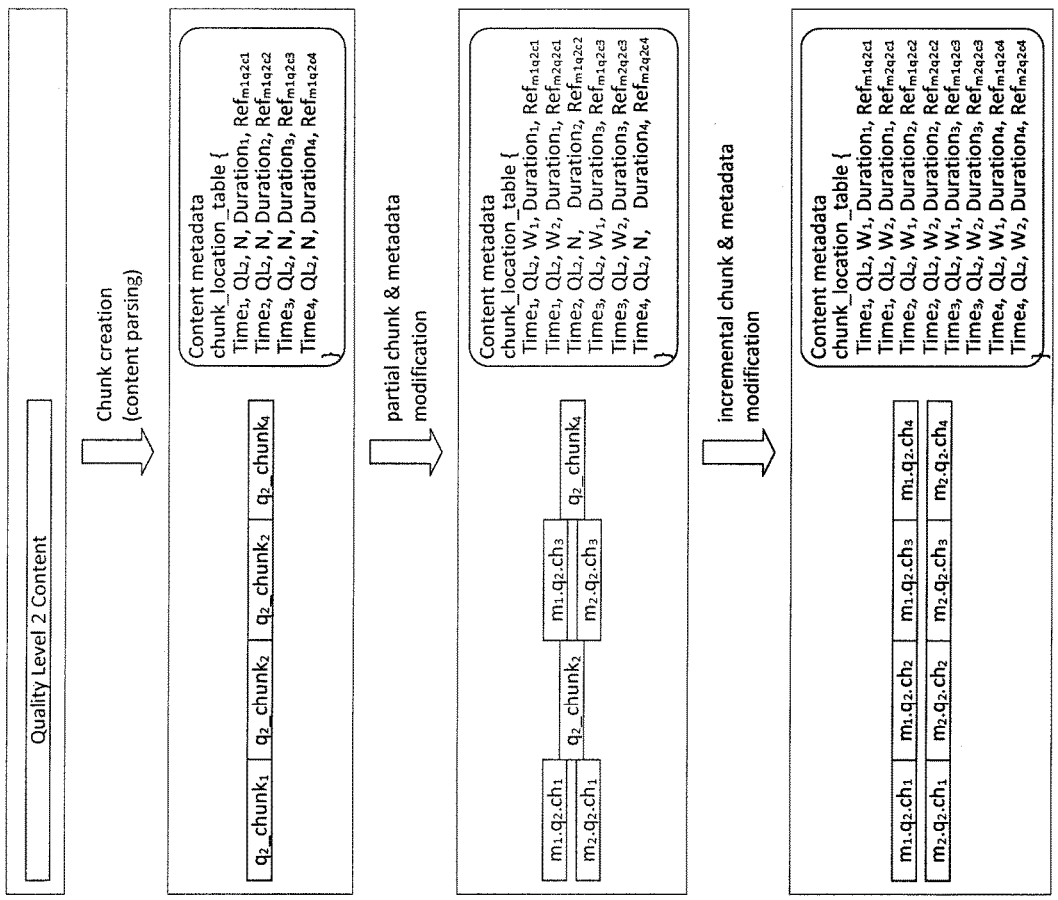
FIG. 7 illustrates the step-wise creation of watermarked content in the first content providing system of FIG. 3.

In FIG. 6, the parsing step splits the content into chunks and adds the metadata. It is followed by a step that duplicates the chunks, embeds a watermark symbol and updates the metadata to reflect these content processing steps. It should be noted that the structure can be a collection of small individual files or a collection of data blocks in a single file. After the parsing step, it is possible to replace the content modification step with a sequence of steps that partially modify the chunks as shown in FIG. 7. The partial chunk modification step only duplicates and modifies selected chunks in the content file. As the metadata captures which chunks have been processed, a later step can process any of the remaining chunks. The method of FIG. 7 may e.g. be applied in the first content providing system depicted in FIG. 3 by a content owner system CO watermarking a first set of content elements and a content aggregator system CA watermarking a second set of content elements. After a sequence of steps a complete pre-watermarked file is produced. Such a pre-watermarked file may e.g. be stored in the head-end system I of FIG. 3.

Figure 8:
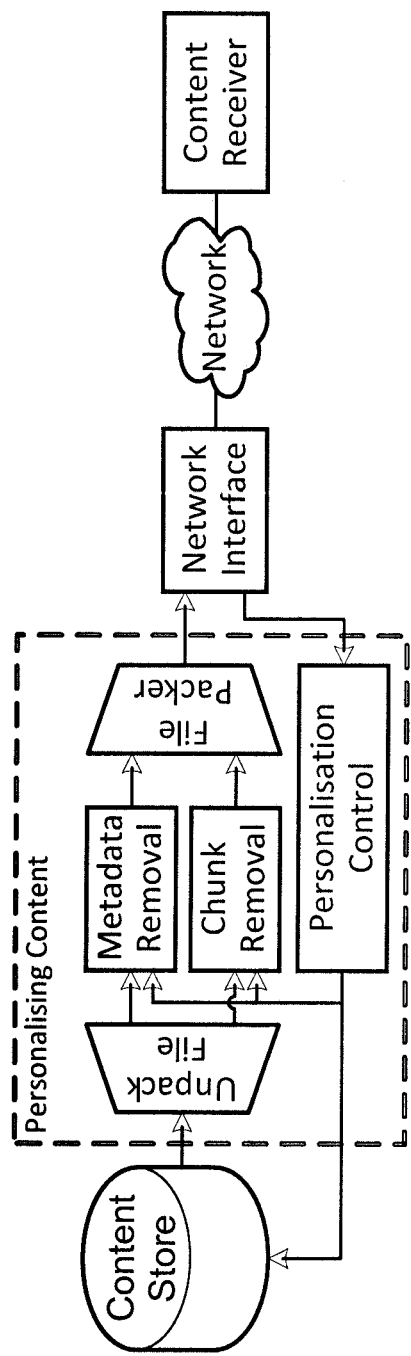
FIG. 8 is a schematic illustration of a head end system as a first party system in accordance with an embodiment of the invention.

The pre-watermarked file forms the basis for the generation of a content stream with a unique watermark. A head-end system I as shown in FIG. 1A, FIG. 3 or FIG. 4 is configured for supporting such personalising of the content as shown in FIG. 8. The fileserver (content store) input to request the delivery of content to a particular further party system is intercepted by a personalisation control module that is part of a personalising content module. The personalisation module instructs the file-server to play out the relevant content and instructs the metadata module and the chunk removal module to personalise the content by removing selected chunks from the content stream in accordance with the embodiment of FIG. 2B. Some input and output file operations are used to keep the content chunks and the metadata in a consistent file format.

Figure 9:
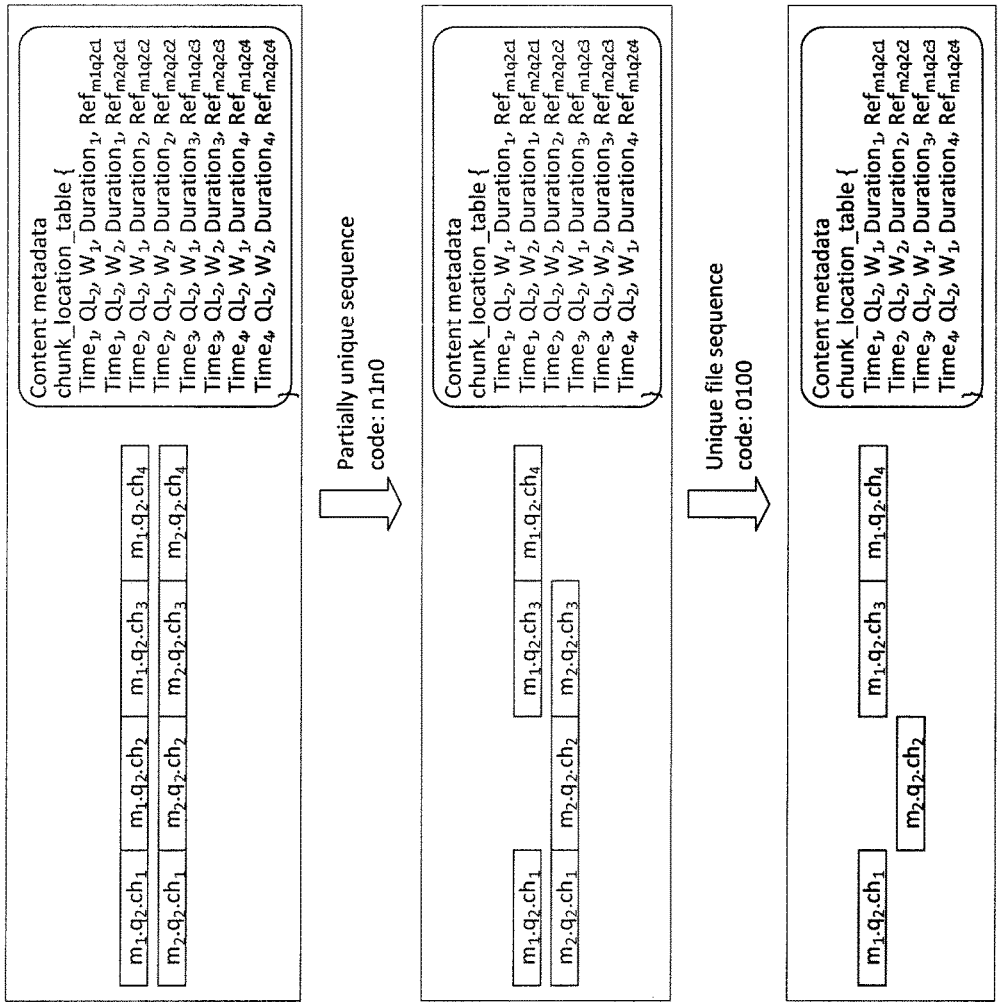
FIG. 9 schematically depicts the selection of watermarked content elements in a multiparty content delivery network.

FIG. 9 is an illustration of obtaining watermarked content by a series of partial selection steps. The first partial selection step performs the watermark selection for the second and fourth chunk (the first content elements), e.g. in the first party system I in accordance with FIG. 2B. In the second step, the remaining (first and third) chunks (the second content elements) are selected on the basis of their embedded watermark symbol values, e.g. in the second party system II of FIG. 2B. The content metadata, comprising watermark selection data used by party systems to identify selectable copies, is also modified.

In practice, the number of chunks will be much larger than four, which makes it possible to perform multiple partial selection steps, e.g. by multiple party systems as illustrated in the content delivery network 4 of FIGS. 3 and 4. At any selection step, alternative chunks may be removed from the pre-watermarked content. After each partial selection step the resulting output is passed on to the next stage in the content distribution chain. After the removal of the last duplicate chunks, the content is fully uniquely watermarked for a particular end-user device 1, 2, 3.

To uniquely identify each content consumer, be it the end-user device or the next party system of the content distribution chain, the file(s) containing the copies should be modified or accessed in such a way that makes a unique subset of copies available to the consumer, leaving the consumer with a watermarked content.

A number of methods can be used to implement the selection of copies, including skipping and dropping, particularly in party systems in a content delivery network 4. It should be noted that other techniques (e.g. insert errors, encrypt with unknown key, mark as metadata) may achieve the same results but may be less bandwidth efficient or may have integration disadvantages.

Skipping is a form of manipulation that allows skipping unnecessary copies while accessing the file/stream where the copies are stored. Skipping allows for issuing a command to jump to an (arbitrary) point in the content. Thus, in the context of the present disclosure, a party system may send jump instructions to a preceding party system in order to select watermarked copies (see e.g. FIG. 2A). The manipulation can be done when the copies are part of a single file.

Figures 11A, 11B:
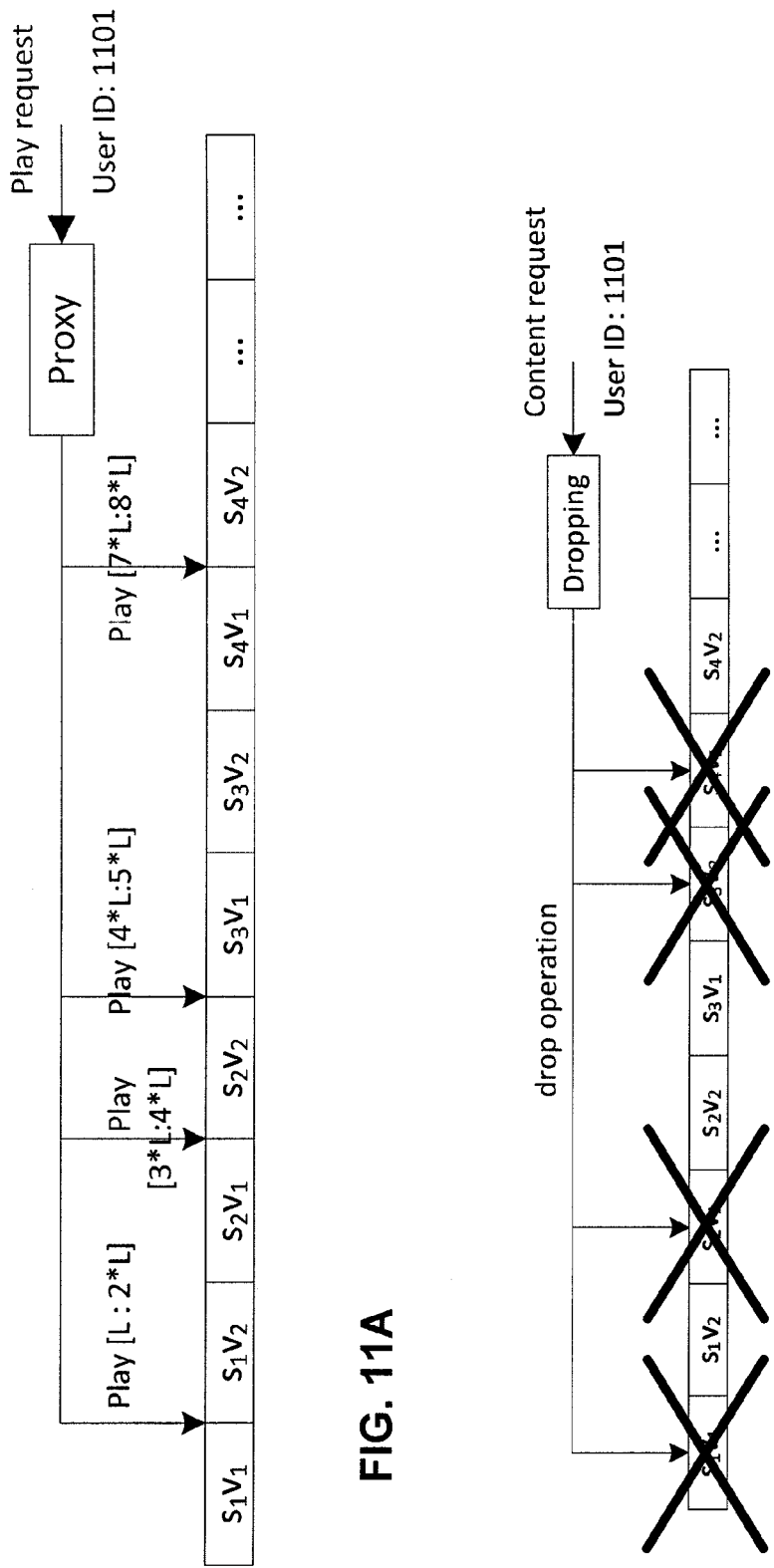
FIGS. 11A and 11B illustrate different alternatives for the location of a system for selecting content elements to obtain a party watermark.

In an embodiment, an end-user client requests access to a certain content. A request, typically, specifies the access range (e.g. all content, from second X to second Y, from byte M to byte N). All requests from clients are filtered or modified by a proxy that is situated between the head-end system I and the client. The selection is done in such a way that it enables skipping over not-to-be-selected copies. The work of such proxy is illustrated in FIG. 11A with an example of RTP/RTSP streaming based VoD solution as described in RFC2326. FIG. 11A illustrates an example of skipping performed on a single file with two interleaved watermark copies. Watermarking is done by determining a watermark {1,1,0,1} for a client request User ID. L is the length (in time) of a copy. Copy v1 is watermarked with bit 0; copy v2 is watermarked with bit 1.

In an embodiment, an RTSP proxy for the Video on Demand server (or File Server) is provided to which the client device connects to instead of the VoD server. The proxy can be a standalone device or an application that can be resident anywhere on the VoD server itself. The proxy takes the requests from the client and converts them to a sequence of appropriate RTSP commands (e.g. RTSP PLAY commands that indicate the start and end of each segment). The sequence of PLAY commands is structured, based on the received parameters from the client, so that the correct watermark selection can be made. This selection is then sent to the VoD server which queues up the requests and executes the full ranges as defined in the play commands.

The principle is illustrated in FIG. 11A. The original PLAY request is transformed into a sequence of play commands with each command targeting one of the two possible copies. In the example, the first content element has two copies—$s_1v_1$ that spans from 0 seconds to L seconds (assuming L is the length of a segment) and $s_1v_2$ that spans from L seconds to 2*L. Copy $s_1v_1$ is watermarked with bit 0 and copy $s_1v_2$ is watermarked with bit 1. Since the first bit of the parameters is '1', the variant $s_1v_2$ should be selected and played out, so the first issued RTSP command is PLAY [L:2*L] (play from time L to time 2*L). The second content element has also two copies—$s_2v_1$ and $s_2v_2$. Because the second bit of the parameters is also '1', s2v2 should be selected and played out and, therefore, the second command is PLAY [3*L:4*L]. It should be noted that the commands that successive copies can be merged into a single command. In the example in FIG. 11A, there are two such commands—

PLAY [3\*L:4\*L] and PLAY [4\*L:5\*L]. These commands can be merged into PLAY [3\*L:5\*L].

To perform RTSP request translation (i.e. to compute the sequence of PLAY commands to put the watermark in without causing a repeat of any of the video sequences), the proxy knows the indices for the VoD asset. It also has the role of ensuring that any subsequent forwarding or rewind commands from the client are translated appropriately to the correct sequence of PLAY commands that are issued to the server to ensure that the correct watermark is still embedded during and after the FF and RR sequence. It may also adapt the SMPTE time stamps to handle the duplication (i.e., if the client request time stamp x, it translates it to 2× to cope with the doubling of the content). The implementation can be as simple as creating a local data structure with SMPTE time stamps and corresponding 0 or 1 watermark value in each time stamp (for the system with bit as the smallest watermark value element) and proxy that listens for the SETUP, PLAY and TEARDOWN commands and generate new ones according to the simple algorithm and the user (or session) ID.

The proposed manipulation supports unicast-based delivery (e.g. VoD) as the process of making watermark unique is done while accessing content on the head-end server I, so the single unique copy of content comes from the server. The discussed approach is not limited to RTP/RTSP, it can be also used on any other protocol that is able to request data range (e.g. TCP/IP).

Another advantageous manner of selecting watermarked copies at a party system is dropping. Dropping is a form of manipulation that allows removing unnecessary copies while transmitting a file/stream with multiple copies of content elements. The manipulation can be efficiently performed when the single-file concept with interleaved copies is employed. Dropping can be advantageously performed in the head-end system I.

In the dropping method, a client requests access to a certain content. The server reads from the storage and transmits the whole file/stream to the client, as shown e.g. in FIGS. 3 and 4. During transmission the server or a network device drops parts of the content that contain copies that are not needed for creating a unique watermark. The dropping element decides which data to drop and which to let flow to the client device based on the user (or session) unique ID of the end-user device 1, 2, 3. FIG. 11B illustrates an example of dropping performed on a single file with two interleaved watermarked copies on the basis of a content request with User ID {1,1,0,1}. Copy v1 is watermarked with bit 0; copy v2 is watermarked with bit 1.

Figure 10A:
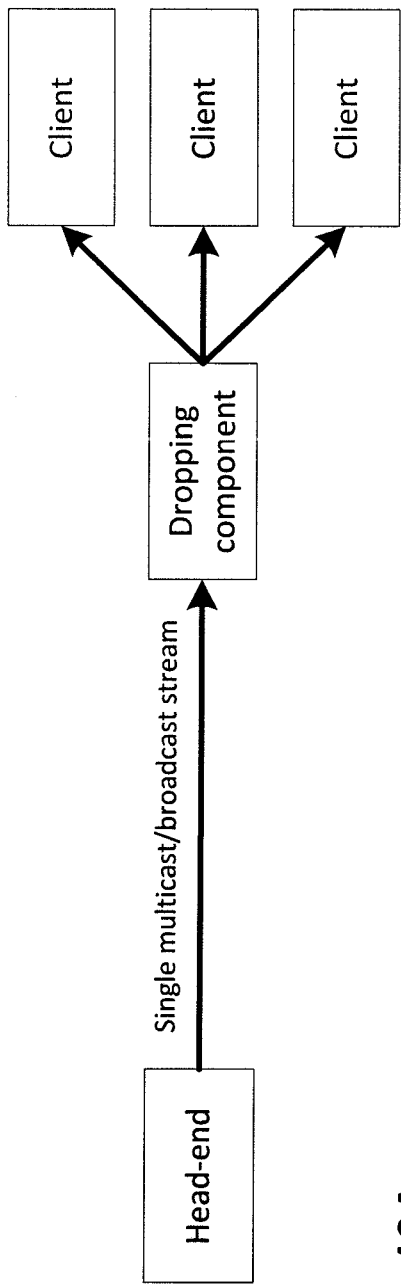
FIGS. 10A and 10B illustrate different methods for selecting content elements from a sequence of content elements in a single file.
Figure 10B:
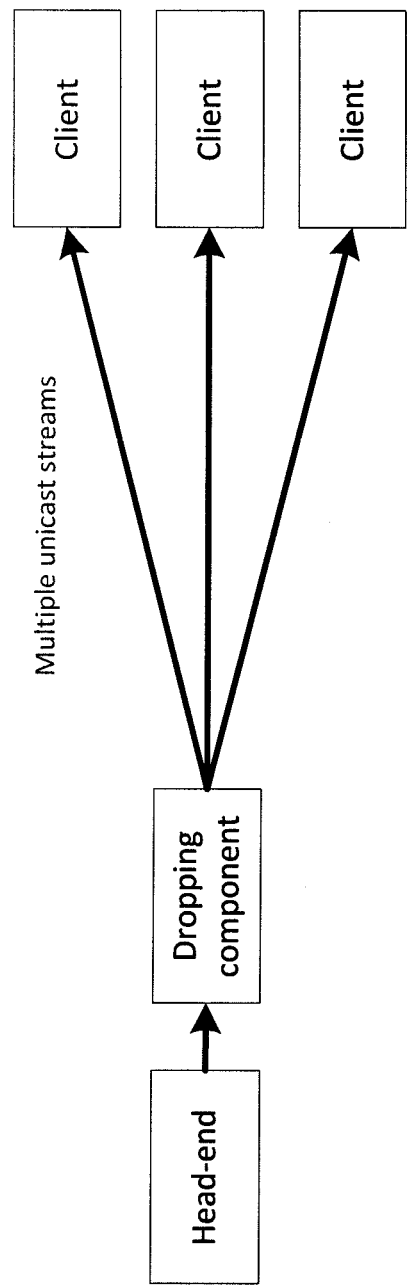

The dropping element is a part of the content delivery network 4 that typically comprises head-end equipment, transport or aggregation network (high speed transport telecom equipment), broadband access site (mainly DSL but also cable and/or optical connections), and consumer equipment. The location of the dropping element can be close to the network edge or close to the head end, as illustrated in FIGS. 10A and 10B. The choice of the position of the dropping element is determined mainly by the choice of delivery method. For unicast solutions (e.g. VoD) the dropping element may be placed at the head-end or on the network edge, whereas for multicast/broadcast solutions (e.g. live TV) the dropping may only occur on the network edge (at the point where a single multicast/broadcast stream is split to many streams directed at each client device, e.g. at DSLAM). For unicast delivery that has a single video stream per client device, locating the dropping at the head-end is more efficient as it requires less amount of equipment and eliminates transmission redundancy.

Figure 12:
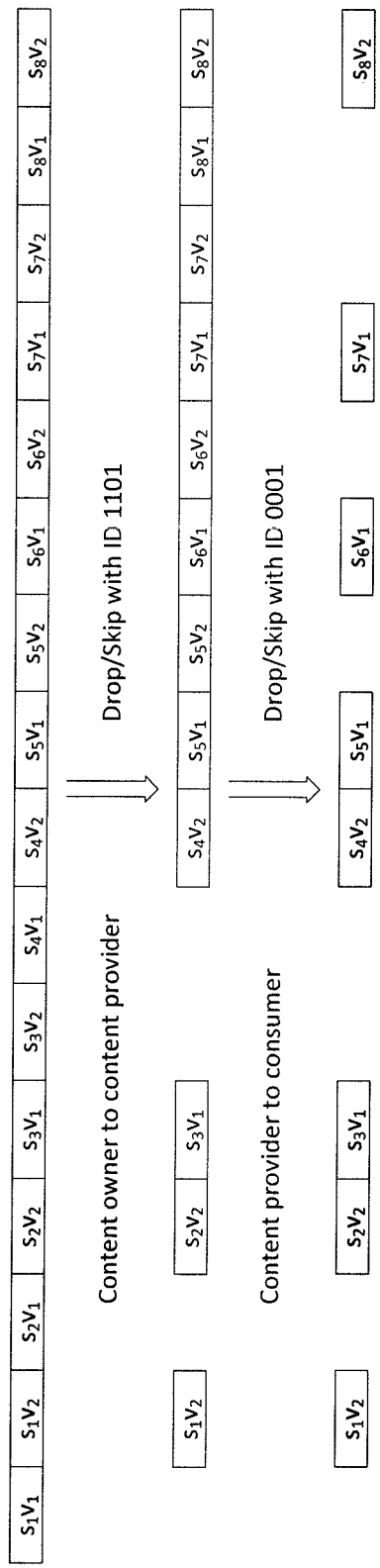
FIG. 12 illustrates the selection of watermarked content elements in a multiparty content delivery system using the methods of FIGS. 11A and 11B.

Finally, FIG. 12 provides an illustration of selecting watermarks in a multiparty content distribution system using the skipping or dropping technique described with reference to FIGS. 11A and 11B. Watermarking solutions based on the skipping and dropping manipulations enable easy and secure content watermarking by multiple members of the content delivery network. The first party system of the distribution chain (e.g. the content owner CO) creates multiple alternatively-watermarked variants of the content and creates a metadata (e.g. an index) that allows selection of copies for making a uniquely watermarked copy. For instance, if number of content elements or chunks is K, the first L (0 to L−1) content elements are used by the first party system I, e.g. a head-end system, to select a watermark that identifies the further distributors. The rest of the content elements (L to K) are left untouched and the metadata is modified to exclude information about selected content elements, while keeping information about to-be-selected content elements untouched. The next party system selects its own watermark by selecting content elements L through M−1, updating the metadata, and so on until the last party system uses copies of content elements till K.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g. read-only memory devices within a computer such as CD-ROM, DVD or Blu-ray disks readable by a suitable drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory, flash memory) on which alterable information is stored.

The invention claimed is:

1. A method for providing watermarked content to an end-user device via a content providing system, the content providing system comprising at least a first party system and a second party system, the method comprising:

providing content elements for the content, wherein at least two copies of at least a first content element and at least two copies of at least a second content element are provided, and wherein the at least two copies of the at least one first content element are provided with different watermarks and the at least two copies of the at least one second content element are provided with different watermarks;

the first party system selecting a first party watermark by selecting a watermarked copy of the at least one first content element of the content elements;

the second party system selecting a second party watermark by selecting a watermarked copy of the at least one second content element, different from the at least one first content element, of the content elements;

delivering watermarked content to the end-user device, the watermarked content containing the watermarked copy for the first content element selected by the first party system and the watermarked copy for the second content element selected by the second party system such that the watermarked content contains the first party watermark and the second party watermark.

2. The method according to claim 1, wherein the content providing system comprises a content delivery network and the first party system and second party system are part of the content delivery network.

3. The method according to claim 1, wherein the content providing system comprises a third party system between the second party system and the end user device, the third party system selecting a third party watermark by selecting a watermarked copy of at least one third content element of the content elements and wherein the watermarked content is delivered to the end user device containing the watermarked copy selected by the third party system such that the watermarked content further contains the third party watermark.

4. The method according to any one of claims 1, wherein the second party system is provided between the first party system and the end-user device and the content providing system further comprises a fourth party system, between the first party system and the end-user device, wherein the fourth party system selects a watermarked copy of at least one fourth content element to obtain a fourth party watermark such that the watermark content contains the first party watermark and the fourth party watermark and the second party watermark is absent.

5. The method according to claim 1, comprising at least one of:
   wherein watermark selection information for selecting the watermarked copy in accordance with the first party watermark is provided from the first party system to the second party system, the second party system having access to at least two copies of the at least one first content element;
   wherein watermark selection information in accordance with the second party watermark is provided to the first party system from the second party system and the first party system transmits to the second party system the selected watermarked copy of the at least one second content element in accordance with the obtained watermark selection information;
   wherein the first party system provides the selected watermarked copy of the at least one first content element and all copies of the at least one second content element to the second party system.

6. The method according to claim 1, wherein at least one of the first party system and the second party system performs watermark selection on the basis of at least one of the position/identity of the first party or second party system in the content providing system and a next destination for the watermarked content elements selected by the first party system or second party system.

7. The method according to claim 1, wherein at least one of the first party system and the second party system is configured for receiving the watermarked content as a single file containing at least the watermarked copies for the at least one second content element and for sending the watermarked content to a particular end-user device, the method comprising at least one of:
   selecting the watermarked copy for the at least one second content element in accordance with the second party watermark in the first party system by skipping; and
   dropping at least one watermarked copy in the single file not associated with the second party watermark in the second party system.

8. A system for providing watermarked content to an end-user device, the system comprising:
   a content element provider configured for providing content elements for the content, wherein at least two copies of at least a first content element and at least two copies of at least a second content element are provided, and wherein the at least two copies of the at least one first content element are provided with different watermarks and the at least two copies of the at least one second content element are provided with different watermarks;
   a first party system configured for selecting a first party watermark by selecting a watermarked copy of the at least one first content element of the content elements;
   a second party system configured for selecting a second party watermark by selecting a watermarked copy of the at least one second content element, different from the at least one first content element, of the content elements;
   wherein the system is arranged for delivering watermarked content to the end-user device, the watermarked content containing the watermarked copy for the first content element selected by the first party system and the watermarked copy for the second content element selected by the second party system such that the watermarked content contains the first party watermark and the second party watermark.

9. The system according to claim 8, wherein the content providing system comprises a content delivery network and the first party system and second party system are part of the content delivery network.

10. The system according to claim 8, wherein the content providing system comprises at least one of:
   a third party system provided between the second party system and the end-user device, the third party system being configured for selecting a third party watermark by selecting a watermarked copy of at least one third content element of the content elements, wherein the system is configured for delivering the watermarked content to the end user device containing the watermarked copy selected by the third party system such that the watermarked content contains the third party watermark;
   a fourth party system provided between the first party system and the end-user device, the fourth party system being configured for selecting a watermarked copy of at least one fourth content element to obtain a fourth party watermark such that the watermark content contains the first party watermark and the fourth party watermark and the second party watermark is absent.

11. The system according to claim 8, wherein at least one of the first party system and the second party system are configured for participating in delivering the watermarked content by at least one of:
   the first party system providing watermark selection information for selecting the watermarked copy in accordance with the first party watermark to the second party system, the second party system containing at least two copies of the at least one first content element;
   the first party system obtaining watermark selection information in accordance with the second party watermark from the second party system and transmitting to the second party system the selected watermarked copy of the at least one second content element in accordance with the received watermark selection information; and
   the first party system providing the selected watermarked copy of the at least one first content element and all copies of the at least one second content element to the second party system.

12. The system according to claim 8, wherein at least one of the first party system and the second party system is configured to perform watermark selection on the basis of at least one of the position/identity of the first party or second party system in the content providing system and a next destination for the watermarked content elements selected by the first party system or second party system.

13. The system according to claim 8, wherein at least one of the first party system and the second party system is configured for:
  receiving the watermarked content as a single file containing at least the watermarked copies for the at least one second content element;
  sending the watermarked content to a particular end user device; and at least one of:
    selecting the watermarked copy for the at least one second content element in the first party system in accordance with the second party watermark by skipping; and
    dropping at least one watermarked copy in the single file not associated with the second party watermark in the second party system.

14. A first party system configured for use as part of a system according to claim 8, wherein the first party system comprises:
  a receiving module configured to receive content elements for content, wherein at least two copies of at least a first content element are received with different watermarks;
  a selection module configured to select a first party watermark by selecting a watermarked copy of the at least a first content element of the content elements; and
  a providing module configured to provide at least part of watermarked content, the at least part of watermarked content containing the watermarked copy for the first content element selected by the first party system.

15. A second party system configured for use as part of a system according to claim 8, wherein the second party system is communicatively connected to a first party system, the second party system comprising:
  a selection module configured to select a second party watermark by selecting a watermarked copy from at least two copies of at least a first content element of content, wherein each copy of the at least two copies have different watermarks,
  wherein the second party system is configured to communicate selection information representing the selected watermarked copy to the first party system.

16. A first party system configured in the system according to claim 8.

17. A second party system configured in the system according to claim 8.

* * * * *